US011680800B2

(12) United States Patent
Gando et al.

(10) Patent No.: US 11,680,800 B2
(45) Date of Patent: Jun. 20, 2023

(54) SENSOR AND ELECTRONIC DEVICE (71) Applicant: KABUSHIKI KAISHA TOSHIBA, Tokyo (JP)

(72) Inventors: Ryunosuke Gando, Yokohama Kanagawa (JP); Daiki Ono, Yokohama Kanagawa (JP); Yasushi Tomizawa, Tokyo (JP); Fumito Miyazaki, Yokohama Kanagawa (JP); Shiori Kaji, Kawasaki Kanagawa (JP); Kei Masunishi, Kawasaki Kanagawa (JP); Hiroki Hiraga, Saitama Saitama (JP); Etsuji Ogawa, Kawasaki Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 113 days.

(21) Appl. No.: 17/445,487

(22) Filed: Aug. 19, 2021

(65) Prior Publication Data
US 2022/0268583 A1 Aug. 25, 2022

(30) Foreign Application Priority Data
Feb. 25, 2021 (JP) .............................. JP2021-028468

(51) Int. Cl.
*G01C 19/5776* (2012.01)
*G01C 19/5783* (2012.01)

(52) U.S. Cl.
CPC ..... *G01C 19/5783* (2013.01); *G01C 19/5776* (2013.01)

(58) Field of Classification Search
CPC ............ G01C 19/5783; G01C 19/5776; G01C 19/5677
See application file for complete search history.

(56) References Cited

U.S. PATENT DOCUMENTS 5,383,362 A * 1/1995 Putty .................. G01C 19/5691
73/504.01
5,635,640 A * 6/1997 Geen ...................... H02N 1/008
310/309

(Continued)

FOREIGN PATENT DOCUMENTS

JP 2018-163141 A 10/2018
JP 2020-36078 A 3/2020

(Continued)

*Primary Examiner* — David J Bolduc
(74) *Attorney, Agent, or Firm* — Finnegan, Henderson, Farabow, Garrett & Dunner, LLP (57) ABSTRACT

According to one embodiment, a sensor includes a sensor part including first and second sensor elements, and a circuit part. The first sensor element includes a first supporter, a first movable part capable of vibrating, first and second electrodes. The first electrode outputs a first signal corresponding to a vibration of the first movable part. The second electrode outputs a second signal corresponding to the vibration of the first movable part. The second sensor element includes a second supporter, a second movable part capable of vibrating, third and fourth electrodes. The third electrode outputs a third signal corresponding to a vibration of the second movable part. The fourth electrode outputs a fourth signal corresponding to the vibration of the second movable part. The circuit part includes a calculator. The calculator outputs a differential operation result between first and second processing signals.

20 Claims, 8 Drawing Sheets

(56) References Cited

U.S. PATENT DOCUMENTS

| | | | |
|---|---|---|---|
| 5,817,940 A * | 10/1998 | Kobayashi | G01C 19/5677 |
| | | | 73/504.12 |
| 10,236,858 B1 * | 3/2019 | Sorenson | H01L 41/1132 |
| 2010/0294039 A1 * | 11/2010 | Geen | G01C 19/5776 |
| | | | 73/504.12 |
| 2011/0041609 A1 * | 2/2011 | Clark | G01C 19/5712 |
| | | | 73/514.29 |
| 2011/0252886 A1 * | 10/2011 | Asano | G01C 19/5776 |
| | | | 73/504.12 |
| 2012/0192648 A1 * | 8/2012 | Geen | G01C 19/5776 |
| | | | 73/504.12 |
| 2014/0102195 A1 * | 4/2014 | Geen | G01C 19/56 |
| | | | 73/514.02 |
| 2017/0023364 A1 * | 1/2017 | Gregory | G01P 21/00 |
| 2018/0274923 A1 | 9/2018 | Ikehashi | |
| 2020/0067479 A1 | 2/2020 | Ikehashi | |
| 2020/0284582 A1 | 9/2020 | Kaji et al. | |
| 2020/0363205 A1 | 11/2020 | Gando et al. | |
| 2021/0284527 A1 * | 9/2021 | Endean | G01C 25/00 |
| 2021/0381831 A1 * | 12/2021 | Gando | G01C 19/5776 |

FOREIGN PATENT DOCUMENTS

| | | |
|---|---|---|
| JP | 2020-144065 A | 9/2020 |
| JP | 2020-187018 A | 11/2020 |

\* cited by examiner

SENSOR AND ELECTRONIC DEVICE

CROSS-REFERENCE TO RELATED APPLICATIONS

This application is based upon and claims the benefit of priority from Japanese Patent Application No. 2021-028468, filed on Feb. 25, 2021; the entire contents of which are incorporated herein by reference.

FIELD

Embodiments described herein relate generally to a sensor and an electronic device.

BACKGROUND

There is a sensor such as a gyro sensor or the like. It is desirable to increase the detection accuracy of the sensor and an electronic device.

DETAILED DESCRIPTION

According to one embodiment, a sensor includes a sensor part including a first sensor element and a second sensor element, and a circuit part. The first sensor element includes a first supporter, a first movable part supported by the first supporter and being capable of vibrating, a first electrode, and a second electrode. The first electrode is configured to output a first signal corresponding to a vibration of the first movable part. An orientation from the first supporter toward the first electrode is along a first direction. The second electrode is configured to output a second signal corresponding to the vibration of the first movable part. A direction from the first supporter toward the second electrode is along a second direction crossing the first direction. The second sensor element includes a second supporter, a second movable part supported by the second supporter and being capable of vibrating, a third electrode, and a fourth electrode. The third electrode is configured to output a third signal corresponding to a vibration of the second movable part. An orientation from the second supporter toward the third electrode is along the first direction. The fourth electrode is configured to output a fourth signal corresponding to the vibration of the second movable part. A direction from the second supporter toward the fourth electrode is along the second direction. The orientation from the second supporter toward the third electrode is opposite to the orientation from the first supporter toward the first electrode, and the orientation from the second supporter toward the fourth electrode is the same as the orientation from the first supporter toward the second electrode, or the orientation from the second supporter toward the third electrode is the same as the orientation from the first supporter toward the first electrode, and the orientation from the second supporter toward the fourth electrode is opposite to the orientation from the first supporter toward the second electrode. The circuit part includes a calculator. The calculator is configured to output a differential operation result between a first processing signal and a second processing signal. The first processing signal is based on the first and second signals. The second processing signal is based on the third and fourth signals.

According to one embodiment, an electronic device includes the sensor described above, and a circuit controller configured to control a circuit based on a signal obtained from the sensor.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1:
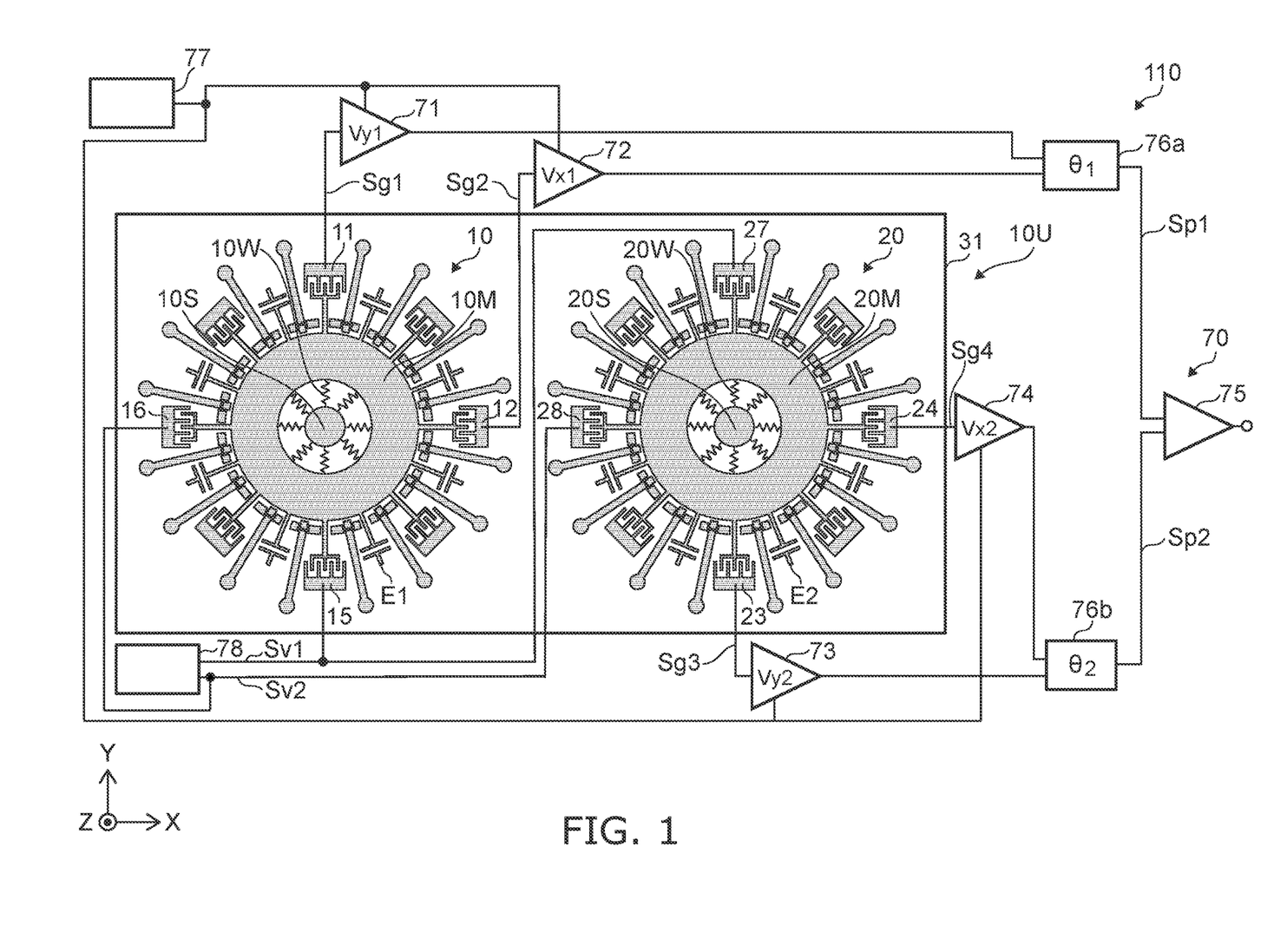
FIG. 1 is a schematic view illustrating a sensor according to a first embodiment.

FIG. 1 is a schematic view illustrating a sensor according to a first embodiment.

As shown in FIG. 1, the sensor 110 according to the first embodiment includes a sensor part 10U and a circuit part 70. The sensor part 10U includes a first sensor element 10 and a second sensor element 20.

The first sensor element 10 includes a first supporter 10S, a first movable part 10M, a first electrode 11, and a second electrode 12.

The first movable part 10M is supported by the first supporter 10S. The first movable part 10M can vibrate. For example, a first spring member 10W that connects the first supporter 10S and the first movable part 10M is provided. The first movable part 10M is supported by the first supporter 10S via the first spring member 10W.

The first electrode 11 is configured to output a first signal Sg1 that corresponds to the vibration of the first movable part 10M. The orientation from the first supporter 10S toward the first electrode 11 is along a first direction. The first direction is, for example, a Y-axis direction.

One direction perpendicular to the Y-axis direction is taken as an X-axis direction. A direction perpendicular to the Y-axis direction and the X-axis direction is taken as a Z-axis direction.

The second electrode 12 is configured to output a second signal Sg2 that corresponds to the vibration of the first movable part 10M. The direction from the first supporter 10S toward the second electrode 12 is along a second direction. The second direction crosses the first direction. The second direction is, for example, the X-axis direction.

The second sensor element 20 includes a second supporter 20S, a second movable part 20M, a third electrode 23, and a fourth electrode 24.

The second movable part 20M is supported by the second supporter 20S. The second movable part 20M can vibrate. For example, a second spring member 20W that connects the second supporter 20S and the second movable part 20M is provided. The second movable part 20M is supported by the second supporter 20S via the second spring member 20W.

The third electrode 23 is configured to output a third signal Sg3 that corresponds to the vibration of the second movable part 20M. The orientation from the second supporter 20S toward the third electrode 23 is along the first direction (the Y-axis direction).

The fourth electrode 24 is configured to output a fourth signal Sg4 that corresponds to the vibration of the second movable part 20M. The direction from the second supporter 20S toward the fourth electrode 24 is along the second direction (the X-axis direction).

In the example, the direction from the first supporter 10S toward the second supporter 20S is along a plane (e.g., the X-Y plane) that includes the first and second directions. For example, the position in the Z-axis direction of the first supporter 10S is the same as the position in the Z-axis direction of the second supporter 20S. As described below, the position in the Z-axis direction of the first supporter 10S may be different from the position in the Z-axis direction of the second supporter 20S.

In the example as shown in FIG. 1, the orientation from the second supporter 20S toward the third electrode 23 is opposite to the orientation from the first supporter 10S toward the first electrode 11. The orientation from the second supporter 20S toward the fourth electrode 24 is the same as the orientation from the first supporter 10S toward the second electrode 12. Thus, according to the embodiment, one of the two detection orientations is opposite between the two sensor elements.

The circuit part 70 includes a calculator 75. The calculator 75 is configured to output a differential operation result between a first processing signal Sp1 that is based on the first and second signals Sg1 and Sg2 and a second processing signal Sp2 that is based on the third and fourth signals Sg3 and Sg4. The first processing signal Sp1 corresponds to the rotation of the first movable part 10M. The second processing signal Sp2 corresponds to the rotation of the second movable part 20M. The differential operation result corresponds to the rotation angles of the first and second sensor elements 10 and 20. For example, the sensor 110 is configured to output, as a detection result, information that relates to the rotation angle of the sensor part 10U.

For example, a rotational force is applied to the sensor part 10U. The rotation includes, for example, a component that has the Z-axis direction as a center. A rotational angular velocity that corresponds to the rotational force is applied to the sensor part 10U. The state of the vibration of the first and second movable parts 10M and 20M is changed thereby. The first to fourth signals Sg1 to Sg4 change according to the change of the state of the vibration. The rotation angle can be detected by processing (e.g., integration) of a signal based on these signals.

For example, there are cases where the signal that is obtained from one sensor element shifts due to the effects of a temperature change, etc. There are cases where the rotational angular velocity or the rotation angle of the detection object shifts from the true value due to the effects of a temperature change, etc. A signal that is obtained from one sensor element includes changes corresponding to the rotation of the detection object and changes corresponding to other factors such as the temperature and the like. Therefore, there are cases where accurate detection is difficult.

The embodiment includes two sensor elements. The signals that are obtained from the two sensor elements each include changes corresponding to the rotation of the detection object and changes corresponding to other factors such as the temperature and the like. The effects due to the other factors such as the temperature, etc., can be removed by differential processing of the signals obtained from the two sensor elements. According to the embodiment as described above, one of the two detection orientations is opposite between the two sensor elements. The signal components that correspond to the rotation do not cancel when such an arrangement is used. Accordingly, the effects due to the other factors such as the temperature, etc., can be removed, and the angle of the detection object can be detected with high accuracy. According to the embodiment, a sensor can be provided in which the accuracy can be increased.

For example, a reference example such as the following may be considered. In the reference example, the orientation from the second supporter 20S toward the third electrode 23 is the same as the orientation from the first supporter 10S toward the first electrode 11; and the orientation from the second supporter 20S toward the fourth electrode 24 is the same as the orientation from the first supporter 10S toward the second electrode 12. In such a case, the signals due to the rotation do not cancel. In the reference example, when performing differential processing of the signals from the two sensor elements, the processing result is 0 when the two sensor elements have the same characteristics.

According to the embodiment, one of the two detection orientations is opposite between the two sensor elements. The two sensor elements do not overlap even when rotating. The effects due to the other factors such as the temperature, etc., can be removed, and the angle of the detection object can be detected with high accuracy.

Examples of the detection orientations of the two sensor elements will now be described.

FIGS. 2A to 2D and FIGS. 3A to 3D are schematic views illustrating the sensor according to the first embodiment.

These drawings show examples of the positions of the first supporter 10S, the first movable part 10M, the first electrode 11, the second electrode 12, the second supporter 20S, the second movable part 20M, the third electrode 23, and the fourth electrode 24. The other members are not illustrated in these drawings.

Figure 2A:
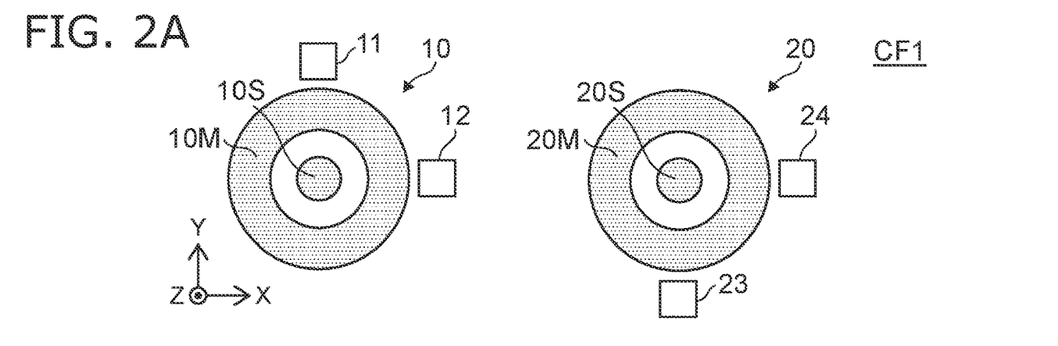
FIGS. 2A to 2D are schematic views illustrating the sensor according to the first embodiment.
Figure 2B:
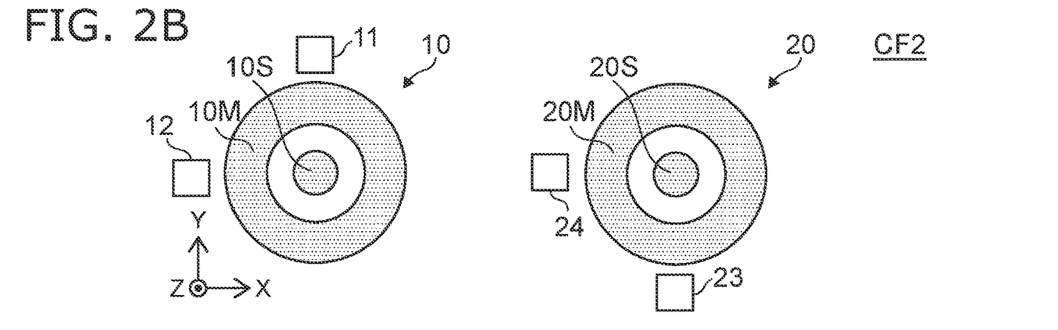

In a first structure CF1 and a second structure CF2 shown in FIGS. 2A and 2B, the orientation from the second supporter 20S toward the third electrode 23 is opposite to the orientation from the first supporter 10S toward the first electrode 11. The orientation from the second supporter 20S toward the fourth electrode 24 is the same as the orientation from the first supporter 10S toward the second electrode 12.

Figure 2C:
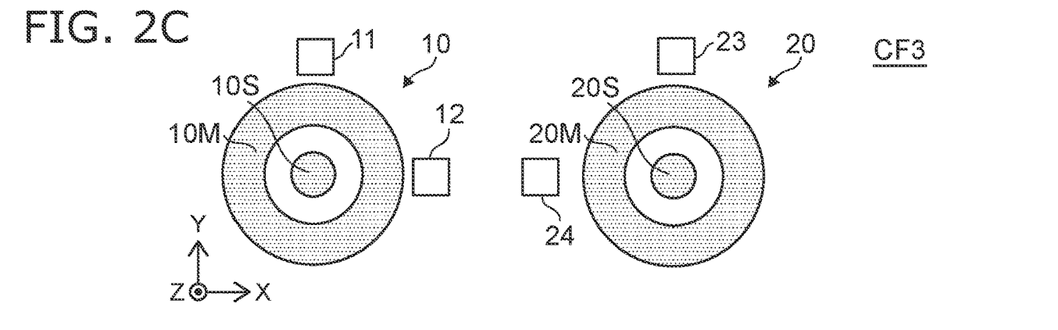
Figure 2D:
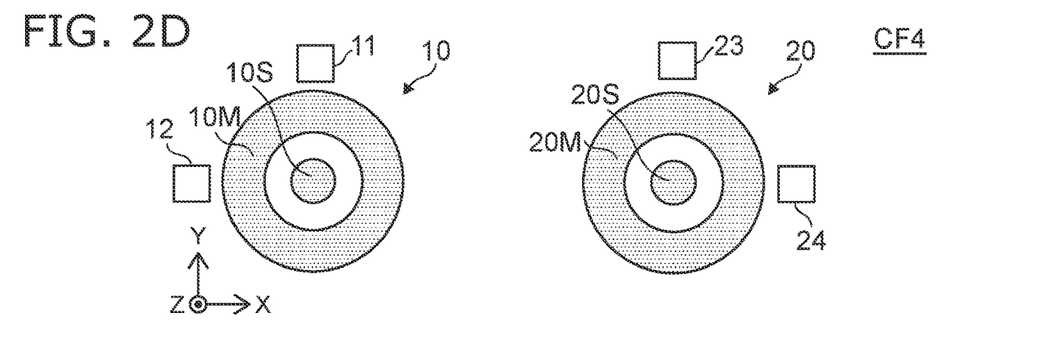

In a third structure CF3 and a fourth structure CF4 shown in FIGS. 2C and 2D, the orientation from the second supporter 20S toward the third electrode 23 is the same as the orientation from the first supporter 10S toward the first electrode 11. The orientation from the second supporter 20S toward the fourth electrode 24 is opposite to the orientation from the first supporter 10S toward the second electrode 12.

In the first to fourth configurations CF1 to CF4, for example, the direction from the first sensor element 10 toward the second sensor element 20 may be along a plane (the X-Y plane) that includes the first and second directions.

The position in a third direction of the first sensor element 10 may be substantially the same as the position in the third direction of the second sensor element 20. The third direction crosses the plane that includes the first and second directions. The third direction is, for example, the Z-axis direction.

In fifth to eighth configurations CF5 to CF8 shown in FIGS. 3A to 3D, the position in the third direction of the first sensor element 10 may be different from the position in the third direction of the second sensor element 20. For example, at least a portion of the first sensor element 10 may overlap the second sensor element 20 in the Z-axis direction.

Figure 3A:
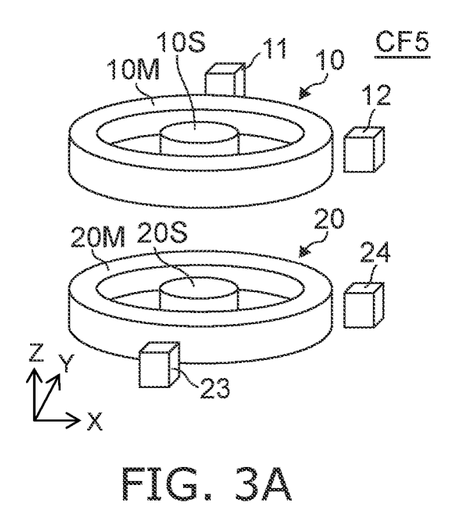
FIGS. 3A to 3D are schematic views illustrating the sensor according to the first embodiment.
Figure 3B:
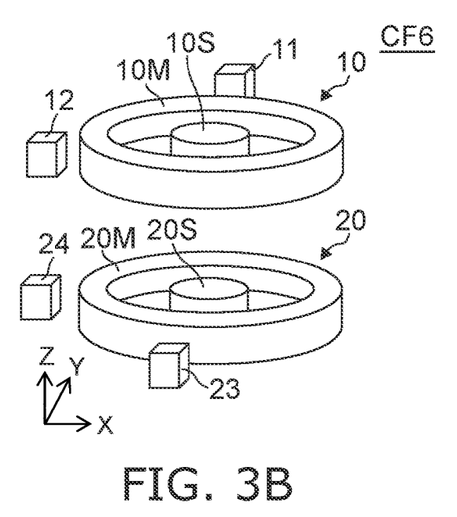

In the fifth and sixth structures CF5 and CF6 shown in FIGS. 3A and 3B, the orientation from the second supporter 20S toward the third electrode 23 is opposite to the orientation from the first supporter 10S toward the first electrode 11. The orientation from the second supporter 20S toward the fourth electrode 24 is the same as the orientation from the first supporter 10S toward the second electrode 12.

Figure 3C:
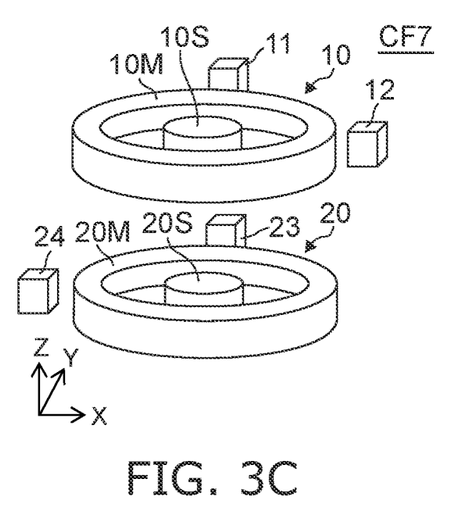
Figure 3D:
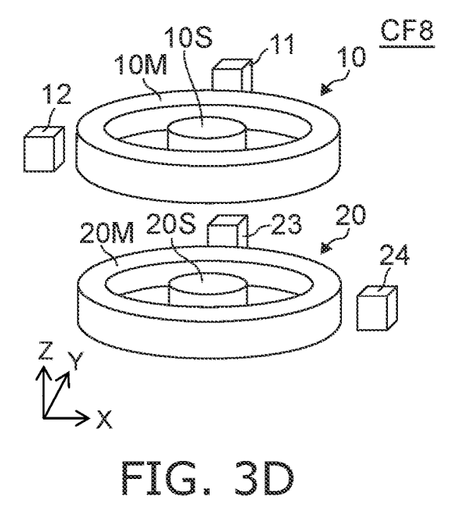

In the seventh and eighth structures CF7 and CF8 shown in FIGS. 3C and 3D, the orientation from the second supporter 20S toward the third electrode 23 is the same as the orientation from the first supporter 10S toward the first electrode 11. The orientation from the second supporter 20S toward the fourth electrode 24 is opposite to the orientation from the first supporter 10S toward the second electrode 12.

By such structures, one of the two detection orientations is opposite between the two sensor elements. By performing differential processing, the effects due to the other factors such as the temperature, etc., can be removed, and the angle of the detection object can be detected with high accuracy. By setting one of the two detection orientations to be opposite between the two sensor elements, a highly-accurate detection is easy using a circuit having a simple configuration.

As shown in FIG. 1, the circuit part 70 may include first to fourth detection circuits 71 to 75. The first signal Sg1 is input to the first detection circuit 71. The second signal Sg2 is input to the second detection circuit 72. The third signal Sg3 is input to the third detection circuit 73. The fourth signal Sg4 is input to the fourth detection circuit 74. These detection circuits output detection signals Vy1, Vx1, Vy2, and Vx2 according to the signals described above.

It is favorable for a common power supply to be connected to the first to fourth detection circuits 71 to 74. The characteristics of these detection circuits are made uniform thereby. For example, a common electrical ground is applied to the multiple detection paths. For example, a common power supply voltage is applied to the multiple detection paths. The characteristics of the multiple detection circuits can be more uniform.

For example, the circuit part 70 may include a power supply circuit 77. The power supply circuit 77 is configured to supply electrical power to the first to fourth detection circuits 71 to 74.

For example, the first detection circuit 71 is configured to output the signal (the detection signal Vy1) that corresponds to the amplitude of the first-direction component of the vibration of the first movable part 10M due to the rotational angular velocity acting on the first movable part 10M vibrating in the second direction. The second detection circuit 72 is configured to output the signal (the detection signal Vx1) that corresponds to the amplitude of the second-direction component of the vibration of the first movable part 10M due to the rotational angular velocity acting on the first movable part 10M vibrating in the first direction.

The third detection circuit 73 is configured to output the signal (the detection signal Vy2) that corresponds to the amplitude of the first-direction component of the vibration of the second movable part 20M due to the rotational angular velocity acting on the second movable part 20M vibrating in the second direction. The fourth detection circuit 74 is configured to output the signal (the detection signal Vx2) that corresponds to the amplitude of the second-direction component of the vibration of the second movable part 20M due to the rotational angular velocity acting on the second movable part 20M vibrating in the first direction.

A signal that is based on the detection signals Vy1, Vx1, Vy2, and Vx2 is supplied to the calculator 75. In the example, the circuit part 70 further includes a first processing circuit 76a and a second processing circuit 76b. The first processing circuit 76a is configured to acquire the output (the detection signal Vy1) of the first detection circuit 71 and the output (the detection signal Vx1) of the second detection circuit 72 and is configured to supply the first processing signal Sp1 to the calculator 75. The second processing circuit 76b is configured to acquire the output (the detection signal Vy2) of the third detection circuit 73 and the output (the detection signal Vx2) of the fourth detection circuit 74 and is configured to supply the second processing signal Sp2 to the calculator 75.

For example, the first processing circuit 76a is configured to calculate information (the first processing signal Sp1) that relates to the angle of the rotation of the first movable part 10M based on the output (the detection signal Vy1) of the first detection circuit 71 and the output (the detection signal Vx1) of the second detection circuit 72. For example, the second processing circuit 76b is configured to calculate information (the second processing signal Sp2) that relates to the angle of the rotation of the second movable part 20M based on the output (the detection signal Vy2) of the third detection circuit 73 and the output (the detection signal Vx2) of the fourth detection circuit 74.

As shown in FIG. 1, the first sensor element 10 may include a fifth electrode 15 and a sixth electrode 16. The first supporter 10S is between the fifth electrode 15 and the first electrode 11 in the first direction (e.g., the Y-axis direction). The first supporter 10S is between the sixth electrode 16 and the second electrode 12 in the second direction (e.g., the X-axis direction). The first movable part 10M vibrates according to a first drive signal Sv1 that is applied to the fifth electrode 15 and a second drive signal Sv2 that is applied to the sixth electrode 16.

The second sensor element 20 may further include a seventh electrode 27 and an eighth electrode 28. The second supporter 20S is between the third electrode 23 and the seventh electrode 27 in the first direction (e.g., the Y-axis direction). The second supporter 20S is between the eighth electrode 28 and the fourth electrode 24 in the second direction (e.g., the X-axis direction). The second movable part 20M vibrates according to the first drive signal Sv1 that is applied to the seventh electrode 27 and the second drive signal Sv2 that is applied to the eighth electrode 28.

The circuit part 70 further includes a drive circuit 78. The drive circuit 78 is configured to supply the first drive signal Sv1 to the fifth and seventh electrodes 15 and 27. The drive circuit 78 is configured to supply the second drive signal Sv2 to the sixth and eighth electrodes 16 and 28.

The first movable part 10M and the second movable part 20M vibrate according to these drive signals. The state of the vibration changes due to the rotational force (the rotational angular velocity) applied from the outside. For example, the change of the state of the vibration is based on the Coriolis force.

For example, an angle $\theta_1$ that is represented by the following first formula is calculated in the first processing circuit 76a. For example, an angle $\theta_2$ that is represented by the following second formula is calculated in the second processing circuit 76b.

$$\theta_1 = \int (+\Omega) dt + \int (+a_1 T) dt \quad (1)$$

$$\theta_2 = \int (-\Omega) dt + \int (+a_2 T) dt \quad (2)$$

In the description described above "$\Omega$" is the angular velocity of the detection object. "T" is the temperature. "$a_1$" is a coefficient of the first sensor element 10. "$a_2$" is a coefficient of the second sensor element 20. "$a_1$" and "$a_2$" have one relationship. For example, $a_1/a_2$ is a constant.

Operations that relate to the following third formula are performed based on these angles in the calculator 75.

$$\frac{\theta_1 - \frac{a_1}{a_2}\theta_2}{\left(1 + \frac{a_1}{a_2}\right)} = \int (\Omega) dt \quad (3)$$

The right side of the third formula corresponds to the angle of the detection object.

For example, the circuit part 70 (or the calculator 75) may be an electronic circuit (including a computer, etc.). For example, the sensor 110 may be included in a sensor device 210 (e.g., an IMU (Inertial Measurement Unit)).

As shown in FIG. 1, the first sensor element 10 may include another electrode such as a regulation electrode E1, etc. The second sensor element 20 may include another electrode such as a regulation electrode E2, etc.

Figure 4:
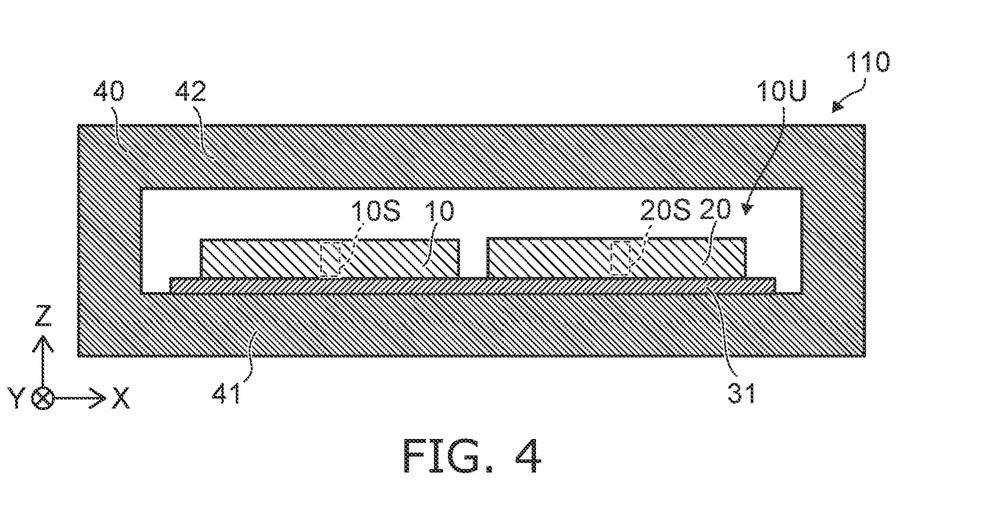
FIG. 4 is a schematic cross-sectional view illustrating a sensor according to the first embodiment.

FIG. 4 is a schematic cross-sectional view illustrating a sensor according to the first embodiment.

In the sensor 110 according to the embodiment as shown in FIG. 4, the sensor part 10U includes a first base body 31. The first base body 31 is, for example, a substrate. The first base body 31 may be, for example, a semiconductor substrate (e.g., a silicon substrate, etc.). The first sensor element 10 and the second sensor element 20 are formed on the first base body 31. For example, the first supporter 10S is fixed to a portion of the first base body 31. The second supporter 20S is fixed to another portion of the first base body 31. The direction from the first supporter 10S toward the second supporter 20S is along a plane (e.g., the X-Y plane) that includes the first and second directions.

The sensor 110 may include a housing 40. The sensor part 10U is located in the housing 40. The housing 40 includes, for example, a first member 41 and a second member 42. For example, the sensor part 10U is fixed to the first member 41. The sensor part 10U is between the first member 41 and the second member 42.

Figure 5:
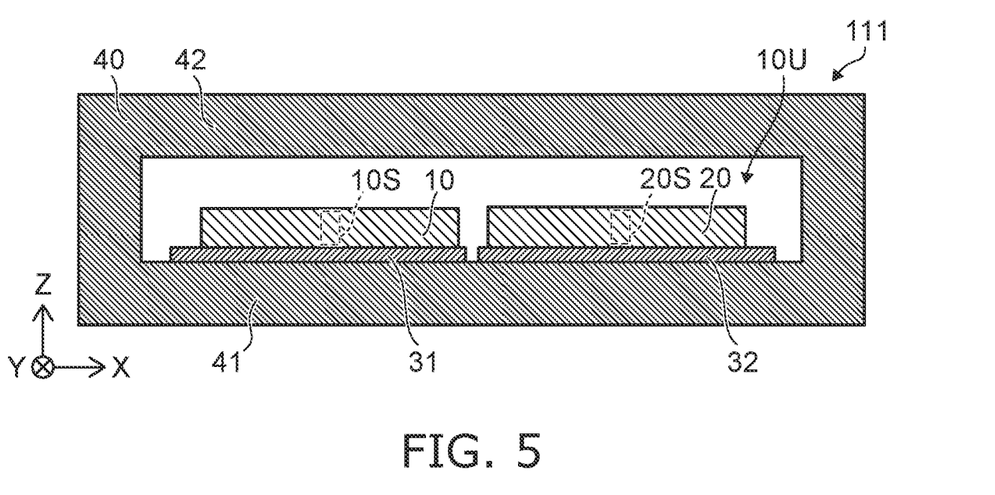
FIG. 5 is a schematic cross-sectional view illustrating a sensor according to the first embodiment.

FIG. 5 is a schematic cross-sectional view illustrating a sensor according to the first embodiment.

In the sensor 111 according to the embodiment as shown in FIG. 5, the first sensor element 10 includes the first base body 31. The second sensor element 20 includes a second base body 32. The sensor part 10U is located in the housing 40. The first sensor element 10 and the second sensor element 20 are fixed to the first member 41 of the housing 40. In the example as well, the direction from the first sensor element 10 toward the second sensor element 20 is along a plane (the X-Y plane) that includes the first and second directions.

Figure 6:
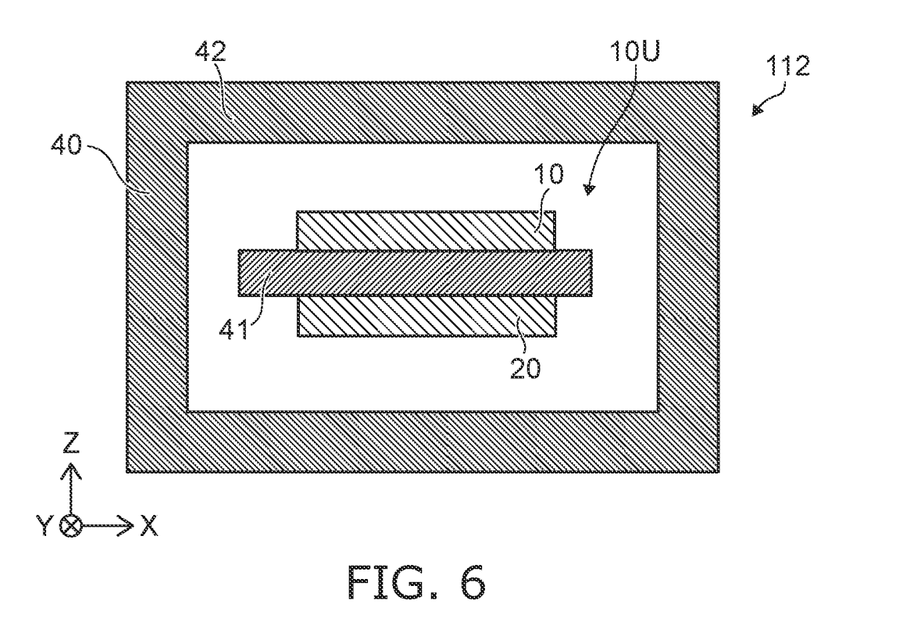
FIG. 6 is a schematic cross-sectional view illustrating a sensor according to the first embodiment.

FIG. 6 is a schematic cross-sectional view illustrating a sensor according to the first embodiment.

As shown in FIG. 6, the sensor 112 according to the embodiment includes the first member 41. The first member 41 is between the first sensor element 10 and the second sensor element 20 in the third direction (e.g., the Z-axis direction) that crosses a plane including the first and second directions. The sensor part 10U is located in the housing 40.

Figure 7:
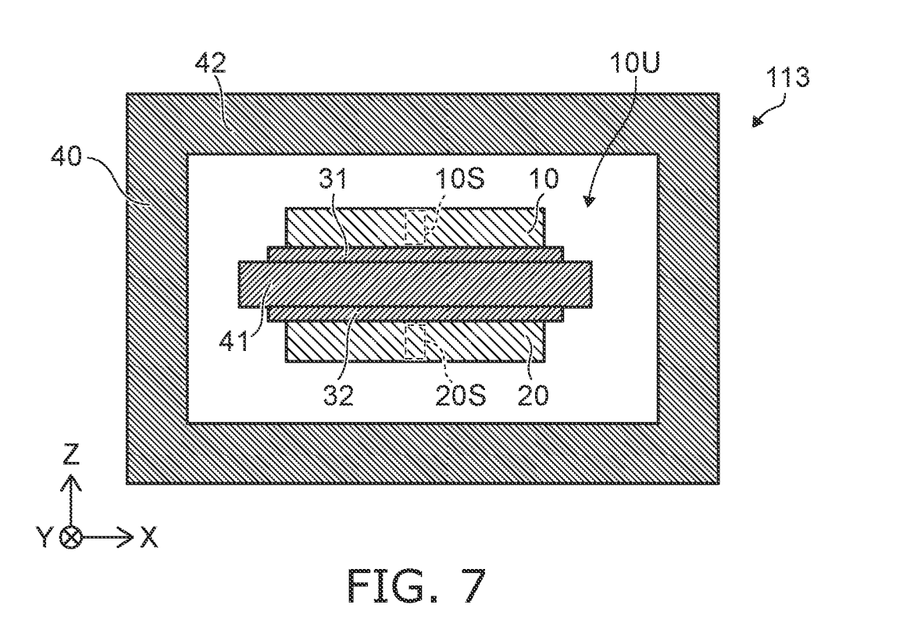
FIG. 7 is a schematic cross-sectional view illustrating a sensor according to the first embodiment.

FIG. 7 is a schematic cross-sectional view illustrating a sensor according to the first embodiment.

In the sensor 113 according to the embodiment as shown in FIG. 7, the first member 41 is between the first sensor element 10 and the second sensor element 20. The first sensor element 10 includes the first base body 31. The second sensor element 20 includes the second base body 32. The sensor part 10U is located in the housing 40.

In the sensors 110 to 113, the temperature of the first sensor element 10 is substantially equal to the temperature of the second sensor element 20. For example, the temperatures of the two sensor elements become substantially equal via the first base body 31. For example, the temperatures of the two sensor elements become substantially equal via the first member 41. The difference between the temperature of the first sensor element 10 and the temperature of the second sensor element 20 may be, for example, not more than 5° C. Detection is possible with a higher accuracy by setting the temperatures to be substantially the same.

Figure 8:
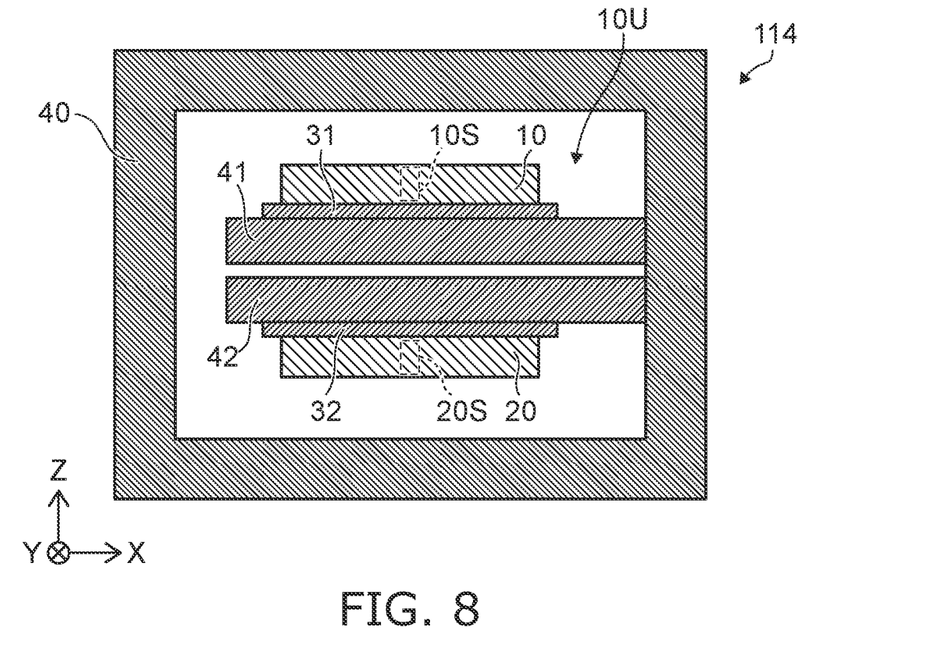
FIG. 8 is a schematic cross-sectional view illustrating a sensor according to the first embodiment.

FIG. 8 is a schematic cross-sectional view illustrating a sensor according to the first embodiment.

As shown in FIG. 8, the sensor 114 according to the embodiment includes the first member 41 and the second member 42. The first sensor element 10 is fixed to the first member 41. The second sensor element 20 is fixed to the second member 42. The second member 42 is between the second sensor element 20 and the first sensor element 10. The first member 41 is between the second member 42 and the first sensor element 10.

The first member 41, the second member 42, the first sensor element 10, and the second sensor element 20 are located in the housing 40. In the example, the first member 41 and the second member 42 are connected with the housing 40. The temperature of the second member 42 is substantially equal to the temperature of the first member 41.

Figure 9:
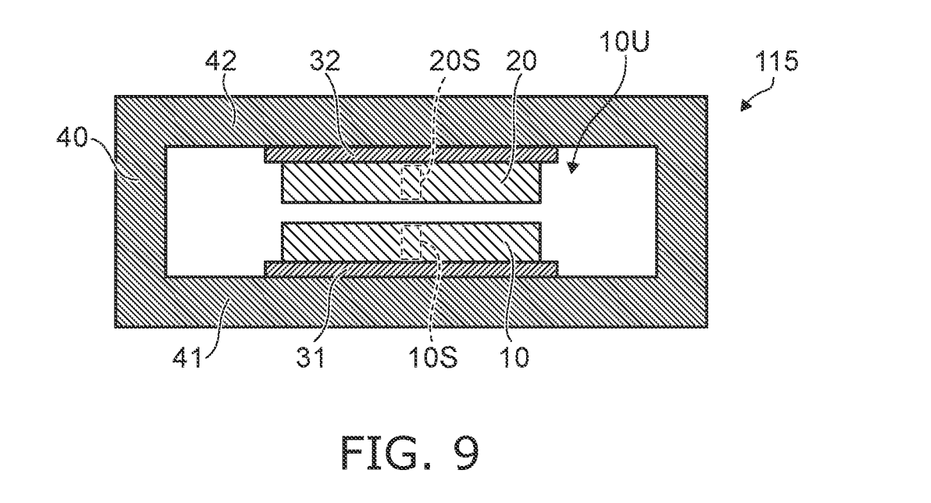
FIG. 9 is a schematic cross-sectional view illustrating a sensor according to the first embodiment.

FIG. 9 is a schematic cross-sectional view illustrating a sensor according to the first embodiment.

As shown in FIG. 9, the sensor 115 according to the embodiment includes the housing 40. The housing 40 includes the first member 41 and the second member 42. The first sensor element 10 is fixed to the first member 41. The second sensor element 20 is fixed to the second member 42. The first sensor element 10 is between the first member 41 and the second member 42. The second sensor element 20 is between the first sensor element 10 and the second member 42. The temperature of the second member 42 is substantially equal to the temperature of the first member 41.

In the sensors 114 and 115, for example, the temperatures of the two sensor elements become substantially equal via the first and second members 41 and 42. The difference between the temperature of the first sensor element 10 and the temperature of the second sensor element 20 may be, for example, not more than 5° C. By setting the temperatures to be substantially the same, detection is possible with a higher accuracy.

Second Embodiment

A second embodiment relates to an electronic device.

Figure 10:
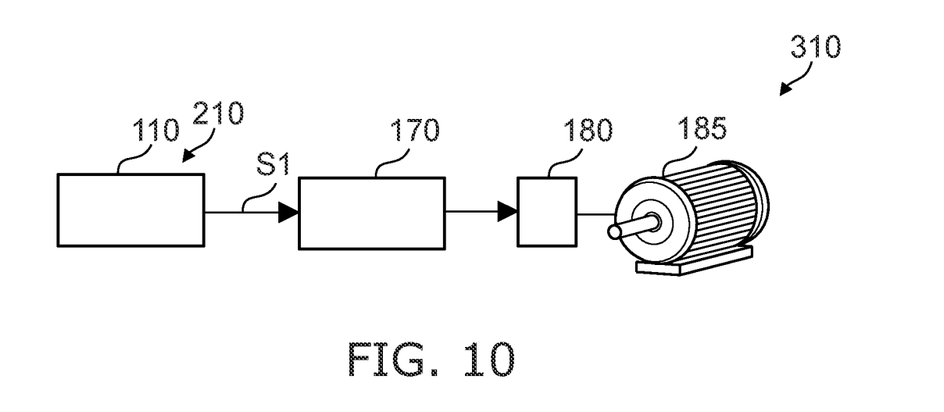
FIG. 10 is a schematic view illustrating an electronic device according to a second embodiment.

FIG. 10 is a schematic view illustrating the electronic device according to the second embodiment.

As shown in FIG. 10, the electronic device 310 according to the embodiment includes the circuit controller 170 and the sensor according to the embodiment. The sensor 110 (or the sensor device 210) is illustrated as the sensor in the example of FIG. 10. The circuit controller 170 is configured to control a circuit 180 based on a signal S1 obtained from the sensor. The circuit 180 is, for example, a control circuit of a drive device 185, etc. According to the embodiment, the circuit 180 for controlling the drive device 185 and the like can be controlled with high accuracy based on the highly-accurate detection result.

FIGS. 11A to 11H are schematic views illustrating applications of the electronic device.

Figure 11A:
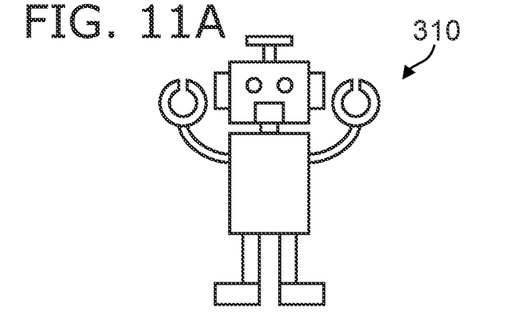
FIGS. 11A to 11H are schematic views illustrating applications of the electronic device.
Figure 11B:
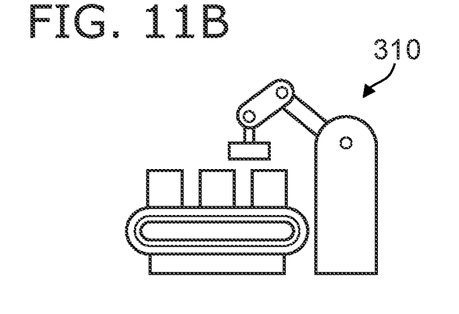
Figure 11C:
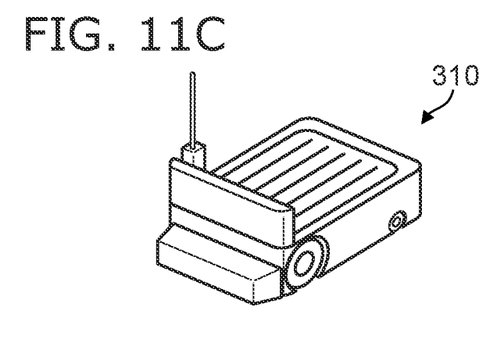
Figure 11D:
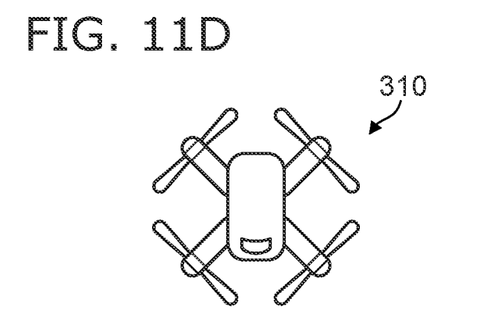
Figure 11E:
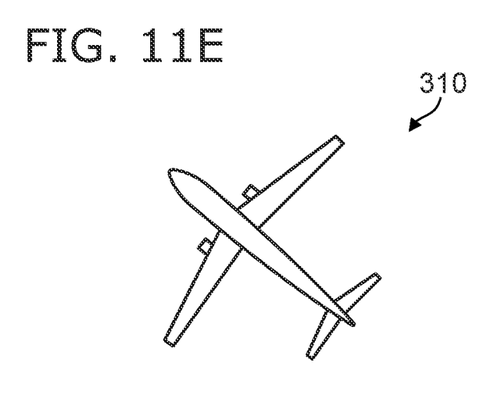
Figure 11F:
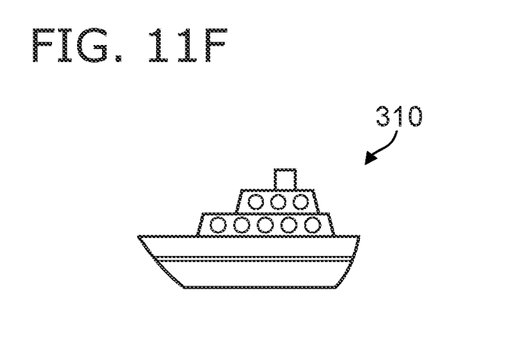
Figure 11G:
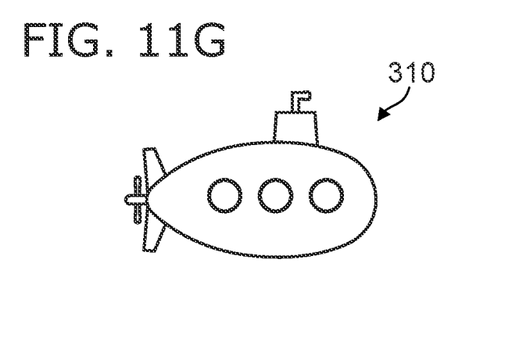
Figure 11H:
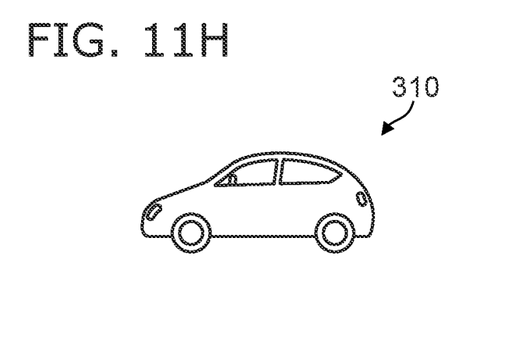

As shown in FIG. 11A, the electronic device 310 may be at least a portion of a robot. As shown in FIG. 11B, the electronic device 310 may be at least a portion of a machining robot provided in a manufacturing plant, etc. As shown in FIG. 11C, the electronic device 310 may be at least a portion of an automatic guided vehicle inside a plant, etc. As shown in FIG. 11D, the electronic device 310 may be at least a portion of a drone (an unmanned aircraft). As shown in FIG. 11E, the electronic device 310 may be at least a portion of an airplane. As shown in FIG. 11F, the electronic device 310 may be at least a portion of a ship. As shown in FIG. 11G, the electronic device 310 may be at least a portion of a submarine. As shown in FIG. 11H, the electronic device 310 may be at least a portion of an automobile. The electronic device 310 may include, for example, at least one of a robot or a mobile body.

For example, highly-accurate sensors are being developed for robots, automatic operation, aircraft, etc. The sensors include, for example, a gyro sensor, etc. For example, the characteristics of the sensor are not always constant due to manufacturing fluctuation, etc. For example, a correction is performed to correct the nonuniformity of the characteristics of the sensor. The effect of the correction decreases when the temperature changes.

According to embodiments, the effects of the temperature can be suppressed by using two sensor elements. For example, the effects of changes of the environment of use such as temperature drift, etc., can be suppressed.

According to embodiments, for example, a common thermal ground is applied to the two elements. According to the embodiment, for example, a common electrical ground and a common power supply voltage are applied to the multiple detection circuits. Detection is possible with a higher accuracy.

Embodiments may include the following configurations (e.g., technological proposals).

Configuration 1

A sensor, comprising:
a sensor part including a first sensor element and a second sensor element; and
a circuit part,
the first sensor element including
a first supporter,
a first movable part supported by the first supporter, the first movable part being capable of vibrating,
a first electrode configured to output a first signal corresponding to a vibration of the first movable part, an orientation from the first supporter toward the first electrode being along a first direction, and
a second electrode configured to output a second signal corresponding to the vibration of the first movable part, a direction from the first supporter toward the second electrode being along a second direction crossing the first direction,
the second sensor element including
a second supporter,
a second movable part supported by the second supporter, the second movable part being capable of vibrating,
a third electrode configured to output a third signal corresponding to a vibration of the second movable part, an orientation from the second supporter toward the third electrode being along the first direction, and
a fourth electrode configured to output a fourth signal corresponding to the vibration of the second movable part, a direction from the second supporter toward the fourth electrode being along the second direction,
the orientation from the second supporter toward the third electrode being opposite to the orientation from the first supporter toward the first electrode, and the orientation from the second supporter toward the fourth electrode being the same as the orientation from the first supporter toward the second electrode, or
the orientation from the second supporter toward the third electrode being the same as the orientation from the first supporter toward the first electrode, and the orientation from the second supporter toward the fourth electrode being opposite to the orientation from the first supporter toward the second electrode,
the circuit part including a calculator,
the calculator being configured to output a differential operation result between a first processing signal and a second processing signal,
the first processing signal being based on the first and second signals,
the second processing signal being based on the third and fourth signals.

Configuration 2

The sensor according to Configuration 1, wherein
the first processing signal corresponds to a rotation of the first movable part, and
the second processing signal corresponds to a rotation of the second movable part.

Configuration 3

The sensor according to Configuration 1 or 2, wherein
the differential operation result corresponds to a rotation angle of the first and second sensor elements.

Configuration 4

The sensor according to any one of Configurations 1 to 3, wherein
the circuit part further includes:
a first detection circuit to which the first signal is input,
a second detection circuit to which the second signal is input,
a third detection circuit to which the third signal is input, and
a fourth detection circuit to which the fourth signal is input,
a power supply is connected to the first to fourth detection circuits, and
the power supply is common to the first to fourth detection circuits.

Configuration 5

The sensor according to any one of Configurations 1 to 3, wherein
the circuit part includes:
a first detection circuit to which the first signal is input,
a second detection circuit to which the second signal is input,
a third detection circuit to which the third signal is input,
a fourth detection circuit to which the fourth signal is input, and
a power supply circuit configured to supply electrical power to the first to fourth detection circuits.

Configuration 6

The sensor according to Configuration 4 or 5, wherein
the first detection circuit is configured to output a signal corresponding to an amplitude of a component in the first direction of the vibration of the first movable part due to a rotational angular velocity acting on the first movable part vibrating in the second direction, and
the second detection circuit is configured to output a signal corresponding to an amplitude of a component in the second direction of the vibration of the first movable part due to the rotational angular velocity acting on the first movable part vibrating in the first direction.

Configuration 7

The sensor according to any one of Configurations 4 to 6, wherein
the third detection circuit is configured to output a signal corresponding to an amplitude of a component in the first direction of the vibration of the second movable part due to a rotational angular velocity acting on the second movable part vibrating in the second direction, and
the fourth detection circuit is configured to output a signal corresponding to an amplitude of a component in the second direction of the vibration of the second movable part due to the rotational angular velocity acting on the second movable part vibrating in the first direction.

Configuration 8

The sensor according to any one of Configurations 4 to 7, wherein
the circuit part further includes a first processing circuit and a second processing circuit,
the first processing circuit is configured to acquire an output of the first detection circuit and an output of the second detection circuit and is configured to supply the first processing signal to the calculator, and
the second processing circuit is configured to acquire an output of the third detection circuit and an output of the fourth detection circuit and is configured to supply the second processing signal to the calculator.

Configuration 9

The sensor according to any one of Configurations 1 to 8, wherein
the first sensor element further includes a fifth electrode and a sixth electrode,
the first supporter is between the fifth electrode and the first electrode in the first direction,
the first supporter is between the sixth electrode and the second electrode in the second direction,
the first movable part vibrates according to a first drive signal and a second drive signal,
the first drive signal is applied to the fifth electrode,
the second drive signal is applied to the sixth electrode,
the second sensor element further includes a seventh electrode and an eighth electrode,
the second supporter is between the third electrode and the seventh electrode in the first direction,
the second supporter is between the eighth electrode and the fourth electrode in the second direction,
the second movable part vibrates according to the first and second drive signals,
the first drive signal is applied to the seventh electrode, and
the second drive signal is applied to the eighth electrode.

Configuration 10

The sensor according to Configuration 9, wherein
the circuit part further Includes a drive circuit,
the drive circuit is configured to supply the first drive signal to the fifth and seventh electrodes, and
the drive circuit is configured to supply the second drive signal to the sixth and eighth electrodes.

Configuration 11

The sensor according to any one of Configurations 1 to 10, wherein
the sensor part further includes a first base body,
the first supporter is fixed to a portion of the first base body,
the second supporter is fixed to an other portion of the first base body, and
a direction from the first supporter toward the second supporter is along a plane including the first and second directions.

Configuration 12

The sensor according to any one of Configurations 1 to 10, further comprising:
a housing including a first member,
the sensor part being located in the housing, and
the first sensor element and the second sensor element being fixed to the first member.

Configuration 13

The sensor according to Configuration 12, wherein
a direction from the first sensor element toward the second sensor element is along a plane including the first and second directions.

Configuration 14

The sensor according to any one of Configurations 1 to 10, further comprising:
a first member,
the first member being between the first sensor element and the second sensor element in a third direction,
the third direction crossing a plane including the first and second directions.

Configuration 15

The sensor according to any one of Configurations 1 to 10, further comprising:
a first member and a second member,
the first sensor element being fixed to the first member,
the second sensor element being fixed to the second member,
the second member being between the second sensor element and the first sensor element,
the first member being between the second member and the first sensor element.

Configuration 16

The sensor according to Configuration 14 or 15, further comprising:
a housing,
the first member, the first sensor element, and the second sensor element being located in the housing.

Configuration 17

The sensor according to any one of Configurations 1 to 10, comprising:
a housing including a first member and a second member,
the first sensor element being fixed to the first member, the second sensor element being fixed to the second member, the first sensor element being between the first member and the second member, the second sensor element being between the first sensor element and the second member.

Configuration 18

The sensor according to any one of Configurations 1 to 17, wherein a difference between a temperature of the first sensor element and a temperature of the second sensor element is not more than 5° C.

Configuration 19

An electronic device, comprising:

the sensor according to any one of Configurations 1 to 18; and a circuit controller configured to control a circuit based on a signal obtained from the sensor.

Configuration 20

The electronic device according to Configuration 19, wherein the electronic device includes at least one of a robot or a mobile body.

According to embodiments, a sensor and an electronic device can be provided in which the accuracy can be increased.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in sensors such as sensor parts, sensor elements, supporters, movable parts, electrodes, circuit parts, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all sensors practicable by an appropriate design modification by one skilled in the art based on the sensors described above as embodiments of the Invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A sensor, comprising:
a sensor part including a first sensor element and a second sensor element; and
a circuit part,
the first sensor element including
   a first supporter,
   a first movable part supported by the first supporter, the first movable part being capable of vibrating,
   a first electrode configured to output a first signal corresponding to a vibration of the first movable part, an orientation from the first supporter toward the first electrode being along a first direction, and
   a second electrode configured to output a second signal corresponding to the vibration of the first movable part, a direction from the first supporter toward the second electrode being along a second direction crossing the first direction,
the second sensor element including
   a second supporter,
   a second movable part supported by the second supporter, the second movable part being capable of vibrating,
   a third electrode configured to output a third signal corresponding to a vibration of the second movable part, an orientation from the second supporter toward the third electrode being along the first direction, and
   a fourth electrode configured to output a fourth signal corresponding to the vibration of the second movable part, a direction from the second supporter toward the fourth electrode being along the second direction,
      the orientation from the second supporter toward the third electrode being opposite to the orientation from the first supporter toward the first electrode, and the orientation from the second supporter toward the fourth electrode being the same as the orientation from the first supporter toward the second electrode, or
      the orientation from the second supporter toward the third electrode being the same as the orientation from the first supporter toward the first electrode, and the orientation from the second supporter toward the fourth electrode being opposite to the orientation from the first supporter toward the second electrode,
the circuit part including a calculator,
the calculator being configured to output a differential operation result between a first processing signal and a second processing signal,
the first processing signal being based on the first and second signals,
the second processing signal being based on the third and fourth signals.

2. The sensor according to claim 1, wherein
the first processing signal corresponds to a rotation of the first movable part, and
the second processing signal corresponds to a rotation of the second movable part.

3. The sensor according to claim 1, wherein
the differential operation result corresponds to a rotation angle of the first and second sensor elements.

4. The sensor according to claim 1, wherein
the circuit part further includes:
   a first detection circuit to which the first signal is input,
   a second detection circuit to which the second signal is input,
   a third detection circuit to which the third signal is input, and
   a fourth detection circuit to which the fourth signal is input, a power supply is connected to the first to fourth detection circuits, and the power supply is common to the first to fourth detection circuits.

5. The sensor according to claim 1, wherein the circuit part Includes:
a first detection circuit to which the first signal is input,
a second detection circuit to which the second signal is input,
a third detection circuit to which the third signal is input,
a fourth detection circuit to which the fourth signal is input, and
a power supply circuit configured to supply electrical power to the first to fourth detection circuits.

6. The sensor according to claim 4, wherein
the first detection circuit is configured to output a signal corresponding to an amplitude of a component in the first direction of the vibration of the first movable part due to a rotational angular velocity acting on the first movable part vibrating in the second direction, and
the second detection circuit is configured to output a signal corresponding to an amplitude of a component in the second direction of the vibration of the first movable part due to the rotational angular velocity acting on the first movable part vibrating in the first direction.

7. The sensor according to claim 4, wherein
the third detection circuit is configured to output a signal corresponding to an amplitude of a component in the first direction of the vibration of the second movable part due to a rotational angular velocity acting on the second movable part vibrating in the second direction, and
the fourth detection circuit is configured to output a signal corresponding to an amplitude of a component in the second direction of the vibration of the second movable part due to the rotational angular velocity acting on the second movable part vibrating in the first direction.

8. The sensor according to claim 4, wherein
the circuit part further includes a first processing circuit and a second processing circuit,
the first processing circuit is configured to acquire an output of the first detection circuit and an output of the second detection circuit and is configured to supply the first processing signal to the calculator, and
the second processing circuit is configured to acquire an output of the third detection circuit and an output of the fourth detection circuit and is configured to supply the second processing signal to the calculator.

9. The sensor according to claim 1, wherein
the first sensor element further includes a fifth electrode and a sixth electrode,
the first supporter is between the fifth electrode and the first electrode in the first direction,
the first supporter is between the sixth electrode and the second electrode in the second direction,
the first movable part vibrates according to a first drive signal and a second drive signal,
the first drive signal is applied to the fifth electrode,
the second drive signal is applied to the sixth electrode,
the second sensor element further includes a seventh electrode and an eighth electrode,
the second supporter is between the third electrode and the seventh electrode in the first direction,
the second supporter is between the eighth electrode and the fourth electrode in the second direction,
the second movable part vibrates according to the first and second drive signals,
the first drive signal is applied to the seventh electrode, and
the second drive signal is applied to the eighth electrode.

10. The sensor according to claim 9, wherein
the circuit part further includes a drive circuit,
the drive circuit is configured to supply the first drive signal to the fifth and seventh electrodes, and
the drive circuit is configured to supply the second drive signal to the sixth and eighth electrodes.

11. The sensor according to claim 1, wherein
the sensor part further includes a first base body,
the first supporter is fixed to a portion of the first base body,
the second supporter is fixed to an other portion of the first base body, and
a direction from the first supporter toward the second supporter is along a plane including the first and second directions.

12. The sensor according to claim 1, further comprising:
a housing including a first member,
the sensor part being located in the housing, and
the first sensor element and the second sensor element being fixed to the first member.

13. The sensor according to claim 12, wherein
a direction from the first sensor element toward the second sensor element is along a plane including the first and second directions.

14. The sensor according to claim 1, further comprising:
a first member,
the first member being between the first sensor element and the second sensor element in a third direction,
the third direction crossing a plane including the first and second directions.

15. The sensor according to claim 1, further comprising:
a first member and a second member,
the first sensor element being fixed to the first member,
the second sensor element being fixed to the second member,
the second member being between the second sensor element and the first sensor element,
the first member being between the second member and the first sensor element.

16. The sensor according to claim 14, further comprising:
a housing,
the first member, the first sensor element, and the second sensor element being located in the housing.

17. The sensor according to claim 1, comprising:
a housing including a first member and a second member,
the first sensor element being fixed to the first member,
the second sensor element being fixed to the second member,
the first sensor element being between the first member and the second member,
the second sensor element being between the first sensor element and the second member.

18. The sensor according to claim 1, wherein
a difference between a temperature of the first sensor element and a temperature of the second sensor element is not more than 5° C.

19. An electronic device, comprising:
the sensor according to claim 1; and
a circuit controller configured to control a circuit based on a signal obtained from the sensor.

20. The electronic device according to claim 19, wherein the electronic device Includes at least one of a robot or a mobile body.

\* \* \* \* \*

UNITED STATES PATENT AND TRADEMARK OFFICE
CERTIFICATE OF CORRECTION

PATENT NO. : 11,680,800 B2
APPLICATION NO. : 17/445487
DATED : June 20, 2023
INVENTOR(S) : Ryunosuke Gando et al.

It is certified that error appears in the above-identified patent and that said Letters Patent is hereby corrected as shown below:

In the Claims

• Claim 5, Column 15, Line 6, "the circuit part Includes:" should read --the circuit part includes--.

• Claim 20, Column 17, Line 2, "the electronic device Includes" should read --the electronic device includes--.

Signed and Sealed this
Seventeenth Day of October, 2023

Katherine Kelly Vidal
*Director of the United States Patent and Trademark Office*